(12) United States Patent
Gruchala et al.

(10) Patent No.: US 7,580,513 B2
(45) Date of Patent: Aug. 25, 2009

(54) TELEPHONE CALL LOG EMAIL

(75) Inventors: Carol Shifrin Gruchala, Naperville, IL (US); Richard John Ebel, Algonquin, IL (US); Kenneth Robert Stroud, Lago Vista, TX (US); James M. Doherty, Georgetown, TX (US); Larry B. Pearson, San Antonio, TX (US)

(73) Assignee: AT&T Intellectual Property I, L.P., Reno, NV (US)

( * ) Notice: Subject to any disclaimer, the term of this patent is extended or adjusted under 35 U.S.C. 154(b) by 710 days.

(21) Appl. No.: 11/085,511

(22) Filed: Mar. 22, 2005

(65) Prior Publication Data

US 2006/0215823 A1 Sep. 28, 2006

(51) Int. Cl.
*H04M 11/00* (2006.01)

(52) U.S. Cl. .................................. 379/93.24

(58) Field of Classification Search ............. 379/93.24, 379/93.23, 90.01, 142.01, 133; 370/352
See application file for complete search history.

(56) References Cited

U.S. PATENT DOCUMENTS

| 5,799,073 | A | 8/1998 | Fieischer, III et al. |
|---|---|---|---|
| 6,091,808 | A | 7/2000 | Wood et al. |
| 6,282,275 | B1 | 8/2001 | Gurbani et al. |
| 6,490,345 | B2 | 12/2002 | Fieischer, III et al. |
| 6,665,388 | B2 * | 12/2003 | Bedingfield ............ 379/142.01 |
| 6,718,021 | B2 | 4/2004 | Crockett et al. |
| 6,724,874 | B2 | 4/2004 | Fieischer, III et al. |
| 6,816,481 | B1 | 11/2004 | Adams et al. |
| 6,904,137 | B2 * | 6/2005 | Brandt et al. ............... 379/126 |
| 6,920,208 | B1 * | 7/2005 | Rosen et al. ................. 379/126 |
| 7,197,123 | B1 * | 3/2007 | Gilbert ................... 379/142.01 |
| 7,315,614 | B2 * | 1/2008 | Bedingfield et al. .... 379/142.07 |
| 2002/0126821 | A1 | 9/2002 | Barak et al. |
| 2003/0026413 | A1 | 2/2003 | Brandt et al. |
| 2003/0063731 | A1 | 4/2003 | Woodring |
| 2003/0086552 | A1 | 5/2003 | Tilike et al. |
| 2003/0185365 | A1 | 10/2003 | Mansfiled |
| 2004/0240651 | A1 | 12/2004 | Adams et al. |
| 2005/0190907 | A1 | 9/2005 | Brandt et al. |
| 2005/0249344 | A1 | 11/2005 | Mueller et al. |
| 2006/0062205 | A1 * | 3/2006 | Doherty et al. ............. 370/352 |

OTHER PUBLICATIONS

U.S. Appl. No. 11/282,662 to Pearson et al.., which was filed on Nov. 21, 2005.

* cited by examiner

*Primary Examiner*—Stella L Woo
(74) *Attorney, Agent, or Firm*—Jackson Walker L.L.P.

(57) ABSTRACT

Call logs are generated based upon calls from a subscriber line and calls to a subscriber line. The call logs are formatted from Generic Data Interface (GDI) messages into an email format (e.g., SMTP) within a call log gateway. The formatted email is then emailed to an email recipient, which can include a messaging service provider or the subscriber himself. The email address to the recipient is determined by the call log gateway based upon the subscriber's identity.

20 Claims, 3 Drawing Sheets

FIG. 3

From: John Doe 555-1212@SBC.com

Reply-to: Postmaster@SBCMessaging.com

To: 555-1234@SBCMessaging.com

Subject: Inbound Call To 555-1234 From John Doe 555-1212

12:00 am PDT March 1, 2006

FIG. 4

From: 555-1234@SBC.com

Reply-to: Postmaster@SBCMessaging.com

To: 555-1234@SBCMessaging.com

Subject: Outbound Call From 555-1234 to 555-1212

12:01 am PDT March 1, 2006

TELEPHONE CALL LOG EMAIL

BACKGROUND OF THE INVENTION

1. Field of the Invention

The present invention relates to the field of telecommunications. More particularly, the present invention relates to emailing a log of incoming telephone calls to and outgoing telephone calls from a subscriber's telephone.

2. Background Information

Presently, a number of advanced intelligent network (AIN) based telecommunications services enable dynamic interaction between the customers and their respective service accounts. Servers, databases, intelligent peripherals and other external data network elements interface with the public switched telephone network (PSTN) to process and store information created during routine handling of telephone calls. For example, names may be associated with incoming calling party numbers using an external directory database while the PSTN is processing the call. The name, telephone number and other call specific information may then be stored in an external database for access by the customer. Information related to outgoing telephone calls placed from a customer's telephone is also accessible to the customer.

Currently, call logs are presented in several different ways. Many telephones and cell phones have the capability to retain a list of called and calling numbers for display to the user. Other services provide access to call log reports. Although these reports are typically paper, web access has also been disclosed in U.S. patent application Ser. No. 09/917,747 to BRANDT et al., filed on Jul. 31, 2001, the disclosure of which is expressly incorporated by reference herein in its entirety. Even though current services store telephone call data, the way the data is presented to the customer can be improved.

The present invention overcomes the problems associated with the prior art, as described below.

BRIEF DESCRIPTION OF THE DRAWINGS

The present invention is further described in the detailed description that follows, by reference to the noted drawings by way of non-limiting examples of preferred embodiments of the present invention, in which like reference numerals represent similar parts throughout several views of the drawings, and in which:

FIG. 3 shows an exemplary incoming call log email, according to an aspect of the present invention; and FIG. 4 shows an exemplary outgoing call log email, according to an aspect of the present invention.

DETAILED DESCRIPTION OF EMBODIMENTS

Figure 1:
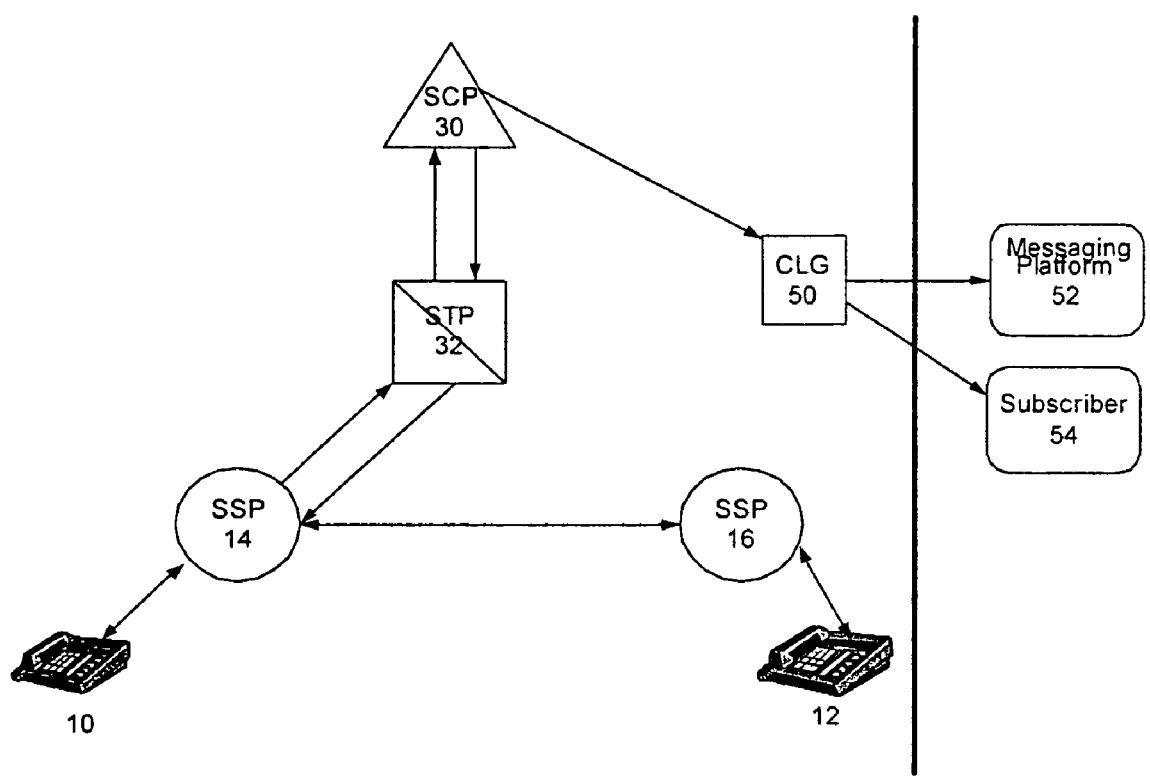
FIG. 1 is a block diagram illustrating system components, according to an aspect of the present invention.

In view of the above, the present invention through one or more of its various aspects and/or embodiments is presented to accomplish one or more objectives and advantages, such as those noted below.

An aspect of the present invention provides a system for emailing outgoing call log data associated with a telephone call from a subscriber's telephone. The system includes a service control point that obtains call log information, and a call log gateway. The call log gateway receives the call log information from the service control point, formats the information into an email format and then forwards an email to a recipient.

In one embodiment, the recipient is an individual subscriber. In another embodiment, the recipient is a messaging service provider.

The call log gateway can receive an InvokeApp message and format the InvokeApp into an SMTP format. The formatting can include placing a calling party number in a from line of the email, the calling party number and a called party number in a subject line of the email, and a time of the call in a message body of the email.

According to another aspect, a system is provided for emailing incoming call log data associated with a telephone call to a subscriber's telephone. The system includes a service control point that obtains call log information, and a call log gateway. The call log gateway receives the call log information from the service control point, formats the information into an email format and then forwards an email to a recipient.

The call log gateway can receive an InvokeApp message and format the InvokeApp into an SMTP format. The formatting can include placing a calling party number in a from line of the email, the calling party number and a called party in a subject line of the email, and a time of the call in a message body of the email.

In a further aspect of the present invention, a method is provided for emailing outgoing call log data associated with a telephone call from a subscriber's telephone. The method includes obtaining call log information. The method also includes formatting the call log information into an email format by placing a calling party number and a called party number in a subject line of an email, and a time of the call in a message body of the email. The method further includes forwarding the email to a recipient, which can be an individual subscriber and/or a messaging service provider.

The method may also include receiving an Invoke App message before formatting. The method may also include determining an email address of the recipient based upon the calling party number.

In still another aspect, a method is provided for emailing incoming call log data associated with a telephone call to a subscriber's telephone. The method includes obtaining call log information, as well as formatting the call log information into an email format. The format has a calling party number and a calling party name in a from line of an email, the calling party number, the calling party name, and a called party number in a subject line of the email, and a time of the call in a message body of the email. The method also includes forwarding the email to a recipient. The method may further include determining an email address of the recipient based upon the called party number.

In yet another aspect, a computer readable medium stores a program for emailing outgoing call log data associated with an outgoing telephone call from a subscriber's telephone and incoming call log data associated with an incoming telephone call to the subscriber's telephone. The medium includes an obtaining code segment that obtains call log information and a formatting code segment. The formatting code segment formats the call log information into an email format by placing a calling party number and a called party number in a subject line of an email, and a time of the outgoing call in a message body of the email, for outgoing calls. For incoming calls, the formatting code segment places the calling party number and the calling party name in the from line of the email, the calling party number, the calling party name, and the called party number in the subject line of the email, and a time of the incoming call in a message body of the email. The medium also includes a forwarding code segment that forwards the email to a recipient, which can be an individual subscriber and/or a messaging service provider.

The medium may also include a receiving code segment that receives an InvokeApp message before the program begins formatting. In another embodiment, the medium includes an address determining code segment that determines an identifier based upon the subscriber, and determines an email address of the recipient and email address of a reply to address based upon the identifier, the email addresses having been previously associated with the identifier.

A call log information service provides a listing of incoming and outgoing calls made to or from a subscriber line. The data is collected in the regulated telephone company and can be sent to a messaging platform (such as a voice mail platform) for manipulation and presentation to the customer, or sent directly to the end user.

An outgoing call log information service tracks calls originating from an end user's line. In one embodiment, the outgoing call log information contains the Calling Number (i.e., end user's number), the Called Number and the date and time of the call.

An incoming call log information service tracks calls received at the subscriber's lines. The incoming call log information can include the Calling Party Number, Calling Name, Called Party Number (subscriber's line), and the time and date of the call.

According to an aspect of the present invention, call log information is sent from a service control point to a call log gateway (CLG). The call log gateway converts the information received from the SCP into an email format (e.g., SMTP) to be forwarded to recipient on a real time basis (e.g., within 2-6 minutes).

FIG. 1 illustrates an exemplary telecommunications network (e.g., the PSTN) on the left side of the vertical line. The exemplary network includes a calling party telephone 10, an originating service switching point (SSP) 14, a terminating SSP 16 and a called party telephone 12. The network also includes a conventional signaling transfer point (STP) 32 and service control point (SCP) 30. By way of example, the SCP 30 may be implemented with a Service Control Point, available from Lucent Technologies, Inc., or a Telcordia Integrated Service Control Point, loaded with ISCP software Version 4.4 (or higher), available from Telcordia, Murray Hill, N.J.

The SSP 14 is the originating central office (CO) for the calling party telephone 10 and the SSP 16 is the terminating CO for the called party telephone 12. However, the terminating CO and the originating CO may be the same, or there may be any number of intervening switches routing the connection between the calling party telephone 10 and the called party telephone 12. The SSPs 14 and 16 include, for example, 1AESS or 5ESS switches manufactured by Lucent Technologies, Inc., or DMS-100 switches manufactured by Nortel Networks Corporation (Nortel), or AXE-10 switches manufactured by Telefonaktiebolaget LM Ericsson, or ESWD switches manufactured by Siemens AG.

The 1AESS switches may use an AIN Release 0.1 protocol and should be equipped with Generic 1AE13.01 (or higher) software and associated AIN SSP features. The 5ESS switches may utilize an AIN Release 0.1 protocol and should be equipped with Generic 5E12 (or higher) software and associated AIN SSP features. The DMS-100 switches (release NA009) may utilize an AIN Release 0.1 protocol and associated AIN SSP features. The AXE-10 switches may utilize an AIN Release 0.1 protocol and should be equipped with Generic 8.07 (or higher) software and associated AIN SSP features. The ESWD switches should be equipped with Release 11 (or higher) and may utilize an AIN Release 0.1 protocol and associated AIN SSP features. The call service logic of the present invention may be upgraded to accommodate future AIN releases and protocols and future trigger types. Specifications of AIN Release 0.1 SSPs may be found in *Telcordia GR-1299-CORE, Switch-Service Control Point/Adjunct Interface*, the disclosure of which is expressly incorporated by reference herein in its entirety.

In an embodiment, AIN triggers are placed on the subscriber's end line. An Off Hook Delay (OHD) trigger on the subscribers line captures outgoing call log information. If other services on the line also use the OHD trigger, preferably the call log information service occurs first. As certain numbers are programmed to escape the OHD trigger (e.g., 911) calls to these numbers on the escape list are not captured in the call because no query is launched to the SCP 30.

Centrex lines can use a Custom Dialing Plan (CDP) trigger to capture the outgoing call log information. In one embodiment, calls placed within the Centrex system are not be captured.

A Termination Attempt Trigger (TAT) is placed on the subscribers line to capture incoming call log information. If other services on the line also use the TAT trigger, preferably the call log information service occurs first. The TAT can also be used for Centrex lines to capture incoming call log information.

FIG. 1 further depicts a call log gateway 50 that communicates with the SCP 30 using, for example, the Generic Data Interface (GDI) protocol over TCP/IP.

The call log gateway 50 implements a socket server to accept connections from the SCP 30 and read and process the incoming TCAP messages. The call log gateway 50 can be a Sun Fire V210 server (available from Sun Microsystems, Inc.) running Solaris 8 or later and containing a MTA (Message Transfer Agent). The server preferably includes two network interface cards to each host connected to a Cisco Catalyst 6500 series switch pair.

The call log gateway 50 converts the data received from the SCP 30 into an email protocol, such as SMTP. The call log gateway 50 then sends the email to a messaging platform 52 or an individual subscriber 54, for each call that is logged, via either the Internet or a private line of a messaging provider. Typically, the email messages containing the call log information are transmitted over the public Internet in an unencrypted format. In one embodiment, the call log gateway 50 stores the data for a period of time (e.g., 72 hours) in case of failure of the email recipient or the links connecting the call log gateway 50 to the email recipient. In one embodiment, the end-to-end time available for call log information to move from the network element (for example, the SCP) into the customer's mailbox shall be less than 2 minutes 90% of the time and less than 6 minutes 100% of the time.

The call log gateway 50 can include capabilities to assure delivery of call log information in the face of network segmentation failures between the call log gateways and the recipient. One capability is the ability to queue approximately 72 hours worth of messages in the event of a network segmentation failure. The call log gateway 50 should be able to handle 1000/transactions each second translating from TCAP/TCP to SMTP/TCP.

As discussed above, the SCP 30 collects the call log information and sends the data to the call log gateway 50. Outgoing call log information can include the following data: Calling Number, Called Number, and date and time of call placed. The SCP 30 collects the information and formats it to be sent to the call log gateway 50, using SR3389 protocol. The SCP 30 is not required to generate any special billing information for this service, thus no AMAslpID will be required. After the data is collected, the SCP 30 sends a Continue message to the SSP 14 to continue processing of the call or advance to another service logic if the customer has other services that utilize the Off-Hook Delay trigger.

Incoming call log information can include the following data: Calling Number; Calling Name, Called Number, and date and time of call received. The SCP 30 obtains the Calling Name from a Calling Name Database and/or LIDB database (both not shown) prior to sending the data to the call log gateway 50. If the calling number is blocked then an indicator that the number is Private should be sent. The number '9999999999' could be sent as the Calling Number if the number is Private. 'PRIVATE' should be sent as the Calling Name. If the Calling Number is unknown or not available from the Calling Name Database and/or LIDB then an indicator that the number is Unknown should be sent. 'UNKNOWN' should be sent as the Calling Name and '1111111111' could be sent as the Calling Number.

Processing of incoming call log information preferably occurs before other services the customer may have that also use a TAT trigger, such as Caller ID with Name. After the information is collected to be sent to the call log gateway 50, the SCP 30 sends an Authorize Termination response to the SSP 14 to complete the call or initiate the other services the customer has on their line that utilize the TAT trigger. Since Calling Name is provided as part of the Call Log Information service, Caller ID with Name service logic does not have to be traversed again.

The SCP 30 needs to link an end user's number with an identifier associated with the recipient of the call log information to enable the call log information to be directed to the proper destination. Thus, the SCP 30 stores data indicating which end user lines subscribe to the call log service, as well as an identifier (four digits in one embodiment) the indicates the recipient of the call log email. The identifier can be sent in each call log information message to associate the call log record with an address of the appropriate recipient.

For each identifier, the call log gateway 50 stores information to formulate email messages. In one embodiment, the information is configured in a text file within the gateway 50. Exemplary information stored in the call log gateway 50 includes two email addresses: one for the message recipient and one for reply messages. The message recipient address is discussed below. The reply address will be referred to as a call log postmaster. The call log postmaster is the user ID that reply messages to call log record email messages are sent. If the service provider does not want these messages directed back to the telephone network system, an address is used that prevents the end-user from replying to call log messages. If reply messages will be accepted, any reply messages can be directed back to a call log postmaster address identified by the service provider.

In one embodiment, a messaging company (e.g., a voice mail provider) 52 is the recipient, the messaging platform 52 distributing the call log email to the ultimate end user. In this case, the messaging platform identifier is used so that the call log gateway 50 can correlate the information with a particular message recipient address: referred to as an MMTA Fully Qualified Domain Name (MMTA-FQDN), which is the public Internet domain name of the platform 52.

If the recipient is an individual 54, the SCP 30 sends the identifier (customer number in this case) to the call log gateway 50. The call log gateway 50 then obtains the recipient address from an internal table, which stores email addresses the customers 54 provided when initially subscribing to the service. In an alternate embodiment, the call log gateway 50 looks up the telephone number of the subscriber 54 (received instead of an identifier) to find an associated email address, which is stored internally.

Figure 2:
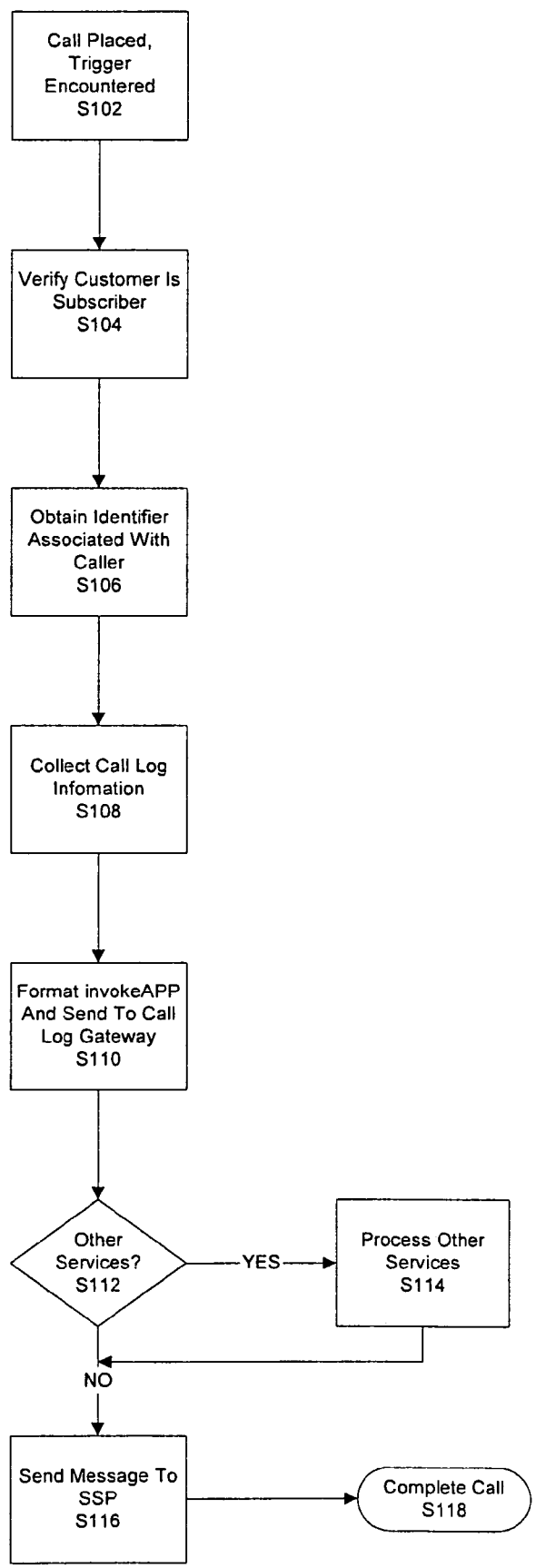
FIG. 2 is an exemplary flow diagram illustrating processing for a call log service, according to an aspect of the present invention.

FIG. 2 is an exemplary flow diagram depicting the subscriber placing a call from subscriber telephone 10 and thus automatically invoking the call log service. As shown at step S102, the subscriber telephone 10 is connected to the local SSP 14 whenever the subscriber telephone 10 goes "off-hook," (i.e., the handset is removed from the cradle or is otherwise activated to receive a dial tone), and digits are dialed. The outgoing call log service is initiated at this point by an AIN trigger, which has been previously set in SSP 14 upon service activation. For incoming call logs, every time the local SSP 16 (of the subscriber 12 instead of subscriber 10) receives a call, the service is initiated by a TAT.

The trigger activated by the SSP 14,16 causes call data to be sent to the SCP 30 for processing, via the existing signaling system 7 (SS7) network (and appropriate STP 32), in a known manner. The call data includes the called party number and the calling party number. The SCP 30 then determines whether the customer (calling party 10 in the case of the outgoing call log service; called party 12 in the case of the incoming call log service) is a subscriber to the service at step S104, and if so, obtains an identifier associated with the subscriber at step S106. At step S108 the SCP collects the call log information. In the case of incoming call logs, a query is initiated to obtain the calling name information. At step S110 the SCP 30 formats the information (as described in more detail below) and forwards the information to the call log gateway 50.

At step S112, the SCP 30 determines whether other services are associated with the trigger. If so (S112:YES), they are processed at step S114. Subsequently, the SCP 30 sends a message to the SSP 14, 16, and the call is completed at step S118. In the case of incoming call logs, a Send Authorize Termination message is sent to SSP 15. In the case of outgoing call logs, a Continue message is sent to SSP 14. If no other services are associated with the trigger (S112:NO), the SCP 30 sends the message to the SSP 14, 15, and the call is completed at step S118.

The SCP 30 (acting as a client) communicates with the call log gateway 50 using TCAP InvokeApp messages. The InvokeApp message, which is preferably the only message used besides overhead and keep alive messages, is encoded using ASN.1 BER (Basic Encoding Rules).

Keep alive requests should be sent to as well as answered by the call log gateway 50. The receiving side must respond within the preconfigured period of time (e.g., ten seconds). If the response to the keep alive message is not received within the time out period, the SCP 30 or the call log gateway 50 can close the connection and the SCP 30 will reestablish the connection. In the event the call log gateway 50 closes the connection it should send an alarm.

The following description explains the mapping of the InvokeApp parameters to the fields of an email message. Some of the email fields required for call logs are passed as parameters in the InvokeApp generic data interface (GDI) call. Some of the fields contained in the email message are static and are supplied by data stored on the call log gateway 50.

In one embodiment, the InvokeApp message includes the following values: Calling Name, Calling Telephone Number; Called Telephone number, the time of the call; and a Messaging Provider ID, which uniquely identifies a messaging provider. It is noted that in addition to the body of the email message, the message format includes Internet mail message header formatting.

Referring to FIG. 3, the InvokeApp parameters can be mapped into email messages as follows: the "From" line includes the Calling Name and Calling Telephone Number, both received from the InvokeApp message. The calling name is the name displayed on Caller ID devices that display calling name and calling number information. This value will be the name if the calling number is known and the call is not marked PRIVATE. When the calling information is not known, this value may be replaced with "UNKNOWN NAME." If the calling information is marked PRIVATE, this value maybe replaced with "PRIVATE NAME." The calling telephone number can be the ten digit telephone number of the caller if known and presentable. If the call is marked PRIVATE, the telephone number can be replaced with "PRIVATE NUMBER." If the calling information is UNKNOWN, the number can be replaced with "UNKNOWN NUMBER."

Other information displayed in the "From" line includes the public Internet domain name of the call log gateway 50. Each call log gateway 50 is assumed to have its own fully qualified domain name (i.e., @CLG-FQMD). This name can let the recipient know that a call log has been received, as well as who sent the email. An example of a "From" line is:

From: John Doe 555-1212@SBC.com

The "Reply-to" line includes the call log postmaster, which is stored in the call log gateway 50 for each messaging provider; and @MMTA-FQDM (the message provider's fully qualified domain name, which is stored in the call log gateway 50). An example is:

Reply-to: Postmaster@SBCMessaging.com

The "To" line includes the called telephone number, received from the InvokeAPP, and @MMTA-FQDM (the message provider's fully qualified domain name, which is stored in the call log gateway 50). An example is:

To: 555-1234@SBCMessaging.com

The "Subject" line includes: Inbound Call To called-telephone number From calling name and calling-telephone-number, all of which are received from the InvokeAPP message. An example is:

Subject: Inbound Call To 555-1234
From John Doe 555-1212

The email message body typically includes the time and date of the call.

Now, an exemplary outbound call log will be described with reference to FIG. 4. The same information is provided in the InvokeAPP, except the calling name is not provided. An email message may have the following information:

The "From" line includes the Calling Telephone Number, received from the InvokeAPP message and the @CLG-FQDN, stored in the call log gateway 50. The "Reply-to" and "To" lines are the same as described above for incoming calls. The "Subject" line can state Outbound Call From <calling-telephone-number> To <called-telephone-number>, both received from the InvokeAPP message. The email message body lists the time and date when the call was placed.

The ActionID in the InvokeAPP header message will be set to '0' for inbound calls and '1' for outbound calls.

As discussed above, in one embodiment, the email messages are sent to a message transfer agent 52, rather than an individual subscriber 54. In this case, the new message transfer agent 52 can be an existing service element that shares many of the functional characteristics of a "normal" Message Transfer Agent (MTA) currently found in the telecommunications system. Configuration changes include only accepting call log email, preferably only from pre-specified call log gateways 50. The new message transfer agent 52 routes call log email to a voice mail box or some other type of messaging center. The correct mailbox or mailboxes are identified based on the calling telephone number on outbound calls and the called telephone number on inbound calls. If the individual mailbox is configured to receive the type of call log email received (e.g., some subscriber may only desire inbound call logs), the call log email is placed into the individual mailbox. If there are no identified mailboxes or if none of the identified mailboxes are configured for call log information, the call log message will be discarded.

The call log gateways 50 can be similar to a standard message transfer agents. Although they may be partitioned into a server-load-balanced pool separate from the non-call log gateway to restrict the source and type of email they receive, there is little difference in the software running on the two pools of message transfer agents (call log gateways and standard MTAs). Preferably, the modified MTA has a fully qualified domain name distinct from the fully qualified domain names used for normal inbound email so the platform does not confuse call log email with other received information. As noted above, in one embodiment the modified message transfer agent only accepts call log email.

Another distinction is that the call log gateway 50 should use the telephone numbers in the call log email to determine the destination subscriber, and use the subscriber's call log settings to determine if the email should be delivered or discarded. This implies access to a subscriber directory. Existing message transfer agents already access the subscriber directory (to determine if a destination email address is valid, to determine the correct message store cluster for the destination subscriber, etc.). Therefore, although the internal logic and use of the subscriber information is different between the two types of message transfer agents, the source and access method to that data is identical.

The call log gateway 50 should generate a new type of service log for each call log received across the TCAP interface. This service log tracks valid and invalid email created for customers. The service log should include at least the calling telephone number, called telephone number, and an indicator as to whether this is an inbound or outbound call log.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods and uses such as are within the scope of the appended claims.

In accordance with various embodiments of the present invention, the methods described are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations of the present invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for Internet and other packet switched network transmission (e.g., TCP/IP, TCAP, GDI, SMTP), and public telephone networks (AIN) represent examples of the state of the art. Such standards are periodically superseded by faster or more efficient equivalents having essentially the same functions. Accordingly, replacement standards and protocols having the same functions are considered equivalents.

What is claimed is:

1. A system for emailing outgoing call log data associated with a telephone call from a user's telephone, the system comprising:
    a network controller that obtains call log information including recipient identifier information indicative of whether a recipient is an individual user or a messaging service provider; and
    a call log gateway that receives the call log information in an InvokeApp message from the network controller, the call log gateway formatting the information into an email format and then forwarding an email to a recipient indicated by the recipient identifier.

2. The system of claim 1, in which the recipient comprises an individual user.

3. The system of claim 1, in which the recipient comprises a messaging service provider.

4. The system of claim 1, in which the call log gateway formats the InvokeApp message into an SMTP format.

5. The system of claim 1, in which the formatting comprises placing a calling party number in a from line of the email, the calling party number and a called party number in a subject line of the email, and a time of the call in a message body of the email.

6. A system for emailing incoming call log data associated with a telephone call to a user's telephone, the system comprising:
    a network controller that obtains call log information including recipient identifier information indicative of whether a recipient is an individual user or a messaging service provider; and
    a call log gateway that receives the call log information in an InvokeApp message from the network controller, the call log gateway formatting the information into an email format and then forwarding an email to a recipient indicated by the recipient identifier.

7. The system of claim 6, in which the call log gateway formats the InvokeApp message into an SMTP format.

8. The system of claim 6, in which the formatting comprises placing a calling party number in a from line of the email, the calling party number and a called party in a subject line of the email, and a time of the call in a message body of the email.

9. A method for emailing outgoing call log data associated with a telephone call from a user's telephone, the method comprising:
    obtaining call log information including recipient identifier information indicative of whether a recipient is an individual user or a messaging service provider;
    formatting the call log information into an email format by mapping InvokeAm parameters to email fields, including placing a calling party number and a called party number in a subject line of an email, and a time of the call in a message body of the email; and
    forwarding the email to a recipient indicated by the recipient identifier,
    wherein the forwarding is initiated at a call log gateway.

10. The method of claim 9, in which the recipient comprises an individual user.

11. The method of claim 9, in which the recipient comprises a messaging service provider.

12. The method of claim 9, further comprising receiving an InvokeApp message before the formatting.

13. The method of claim 9, further comprising determining an email address of the recipient based upon the calling party number.

14. A method for emailing incoming call log data associated with a telephone call to a user's telephone, the method comprising:
    obtaining call log information including recipient identifier information indicative of whether a recipient is an individual user or a messaging service provider;
    formatting the call log information into an email format by mapping InvokeApp parameters to email fields, including placing a calling party number and a calling party name in a from line of an email, the calling party number, the calling party name, and a called party number in a subject line of the email, and a time of the call in a message body of the email; and
    forwarding the email to a recipient indicated by the recipient identifier,
    wherein the forwarding is initiated at a call log gateway.

15. The method of claim 14, further comprising determining an email address of the recipient based upon the called party number.

16. A computer readable medium storing a program for emailing outgoing call log data associated with an outgoing telephone call from a user's telephone and incoming call log data associated with an incoming telephone call to the user's telephone, the medium comprising:
    an obtaining code segment that obtains call log information including recipient identifier information indicative of whether a recipient is an individual user or a messaging service provider;
    a formatting code segment that formats the call log information into an email format by mapping InvokeApp parameters to email fields, including placing a calling party number and a called party number in a subject line of an email, and a time of the outgoing call in a message body of the email, for outgoing calls; and placing the calling party number and the calling party name in the from line of the email, the calling party number, the calling party name, and the called party number in the subject line of the email, and a time of the incoming call in a message body of the email, for incoming calls; and
    a forwarding code segment that forwards the email to a recipient indicated by the recipient identifier, wherein the forwarding is initiated at a call log gateway.

17. The medium of claim 16, in which the recipient comprises an individual user.

18. The medium of claim 16, in which the recipient comprises a messaging service provider.

19. The medium of claim 16, further comprising a receiving code segment that receives an InvokeApp message before the program begins the formatting.

20. The medium of claim 16, further comprising an address determining code segment that determines an identifier based upon the user, and determines an email address of the recipient and email address of a reply to address based upon the identifier, the email addresses having been previously associated with the identifier.

* * * * *